(12) United States Patent
Kremer

(10) Patent No.: US 9,194,880 B2
(45) Date of Patent: Nov. 24, 2015

(54) APPARATUS AND METHODS FOR AIMPOINT CORRECTION

(75) Inventor: Richard Michael Kremer, Ramona, CA (US)

(73) Assignee: Logos Technologies, Inc., Arlington, VA (US)

(*) Notice: Subject to any disclaimer, the term of this patent is extended or adjusted under 35 U.S.C. 154(b) by 0 days.

(21) Appl. No.: 13/516,092

(22) PCT Filed: Dec. 14, 2010

(86) PCT No.: PCT/US2010/060324
§ 371 (c)(1),
(2), (4) Date: Jun. 14, 2012

(87) PCT Pub. No.: WO2011/139306
PCT Pub. Date: Nov. 10, 2011

(65) Prior Publication Data
US 2012/0273571 A1    Nov. 1, 2012

Related U.S. Application Data

(60) Provisional application No. 61/286,146, filed on Dec. 14, 2009.

(51) Int. Cl.
G01P 5/26  (2006.01)
F41G 3/06  (2006.01)
F41G 3/08  (2006.01)
G01S 17/95 (2006.01)

(52) U.S. Cl.
CPC ... G01P 5/26 (2013.01); F41G 3/06 (2013.01); F41G 3/08 (2013.01); G01S 17/95 (2013.01)

(58) Field of Classification Search
CPC .......... G06G 7/80; G01S 17/58; G01S 13/00; G01S 17/02; G01C 3/08; G01N 21/47; F41G 3/06; F41G 5/08; F41G 3/08; F41G 3/065; F41G 1/38; F41G 1/473; F41G 3/26
USPC ............................. 42/119; 356/401; 235/404
See application file for complete search history.

(56) References Cited

U.S. PATENT DOCUMENTS 4,168,906 A * 9/1979 Schwiesow ............. 356/28
5,489,986 A * 2/1996 Magome et al. ......... 356/401

(Continued)

OTHER PUBLICATIONS

Mikhail S. Belen'kii. Effect of residual turbulent scintillation and a remote-sensing technique for simultaneous determination of turbulence and scattering parameters of the atmosphere. Mar. 1994. Optical Society of America. vol. 11, No. 3. p. 1150-1158.*

*Primary Examiner* — Thien M Le
*Assistant Examiner* — Asifa Habib
(74) *Attorney, Agent, or Firm* — Olive Law Group, PLLC; David P. Gloekler

(57) ABSTRACT

In order to determine crosswind effects between a weapon and its intended target (204) a crosswind gradient measuring apparatus (600) directs a first pulsed coherent light beam (646) and a second pulsed coherent light beam (648) to the target (204). Light of both beams scattered back by aerosols in the air is measured by using a detector (652) thus generating a beat frequency in the detector signal. The beat frequency indicates a Doppler-shift due to crosswind as a function of range between weapon and target wherein the range is determined by the time of flight. The information determined by such a Doppler differential interferometer, DDI, is utilized by a signal processor (608) to calculate the bullet's crosswind offset which enables manual of automatic adjustment of an aiming mechanism.

22 Claims, 5 Drawing Sheets

(56) References Cited

U.S. PATENT DOCUMENTS

| | | |
|---|---|---|
| 8,219,266 B2 * | 7/2012 | Puig et al. ................... 701/10 |
| 2007/0103699 A1 * | 5/2007 | Kohnen et al. ............. 356/620 |
| 2009/0266892 A1 * | 10/2009 | Windauer et al. ........... 235/404 |
| 2009/0320348 A1 * | 12/2009 | Kelly .............................. 42/119 |
| 2011/0043785 A1 * | 2/2011 | Cates et al. ..................... 356/28 |

* cited by examiner

APPARATUS AND METHODS FOR AIMPOINT CORRECTION

RELATED APPLICATION

This application claims priority to U.S. Provisional Patent Application Ser. No. 61/286,146, titled "Apparatus and Methods for Aimpoint Correction," filed on Dec. 14, 2009, which is incorporated by reference herein in its entirety.

TECHNICAL FIELD

The present invention relates generally to correcting the aimpoint of a direct fire projectile weapon. More particularly, the present invention relates to aimpoint correction based on measurement of downrange wind gradients.

BACKGROUND

Cross-range wind (crosswind) compensation is part of most precision long-range gunnery. Snipers do it by estimation, training and experience. It is done in tank gunnery, using only the locally measured crosswind speed at the tank. Artillery may use meteorological data for the high altitude winds between battery and target. Crosswind measurement is applicable to any direct-fire projectile and to many indirect-fire weapons as well. The most challenging of these crosswind compensations is the long range sniper scenario. The sniper fires a small projectile (bullet) a long distance through unknown and varied low-level winds. Thus, the sniper scenario is one of the more sensitive cases of cross-range compensation.

Traditionally snipers estimate crosswind based on environmental cues such as grass movements or visible "mirage." These methods rely partially upon instincts and are imprecise and difficult to master. Nevertheless, highly trained snipers use these methods to achieve astonishingly accurate results at times. For instance, in 2004 a world record was set in which six sets of five shots each landed inside a 16 cm circle at 1000 yards. During the afternoon event that same day, however, the same shooter entirely missed the 6' square target 7 of 10 shots before being eliminated from contention.

It is known that the path of a projectile fired from a sniper's rifle (e.g., a bullet fired from a rifle) will be adversely affected by any crosswinds existing between the firearm and the desired target. For example, a crosswind having a horizontal component orthogonal to the line of sight between the weapon and the target will deflect the projectile to the left or right of the target. Depending on such factors as the magnitude of the horizontal (or vertical) crosswind component, the distance between the firearm and the target, and the size of the target, mass of the projectile, a crosswind may result in an otherwise properly aimed projectile missing the target entirely. Hence, crosswinds present a significant challenge in situations calling for precise targeting, particularly over long distances.

Indirect methods such as Doppler triangulation or dynamic speckle statistics have operational drawbacks due to large footprints, large apparatuses, or long data collection times. Moreover, such conventional methods are not able to adequately account for a non-homogeneous crosswind, i.e., a crosswind having a magnitude that varies along the distance between the firearm and the target. In addition, conventional methods are prone to inaccuracies occasioned by motion and/or vibration of the measuring device. Some examples of approaches that attempt to gauge cross-range wind include: eye-balling a target with instincts and training 102, FIG. 1; laser Doppler velocimeter (LDV) that only measures tailwinds 104, FIG. 1; LDV parallax that is able to determine cross-range wind compensation, but is restricted to wide-open spaces and requires cumbersome equipment 106, FIG. 1; scintillation correction may work in homogeneous wind applications, but is less efficient in non-homogeneous wind 108, FIG. 1; and instrumented range which is impractical in real world applications because anemometers are placed at multiple points (i.e. every 50 meters) between the weapon and the target 110, FIG. 1.

None of these approaches solves the problems of cross-range wind compensation. It would be therefore be advantageous to be able to easily measure the crosswind between a weapon and its intended target and then be able to adjust the aimpoint of the weapon by an offset amount that accounts for the measured crosswind.

In view of the foregoing, the present disclosure provides a novel approach to determining the crosswind as a function of downrange distance that does not have the drawbacks of previous attempts.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, systems, apparatuses, devices, instruments, and/or methods are provided for determining crosswind (either horizontal or vertical) from measurements of downrange wind gradients.

In some examples, an interferometric device may be provided. According to another implementation, systems, apparatuses, devices, instruments, and/or methods are provided for executing an algorithm that computes bullet path offset due to potentially non-homogeneous crosswinds.

According to another implementation, systems, apparatuses, devices, instruments, and/or methods are provided for manually or automatically adjusting a shooter's aiming reticle to display or otherwise indicate a compensated impact point.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
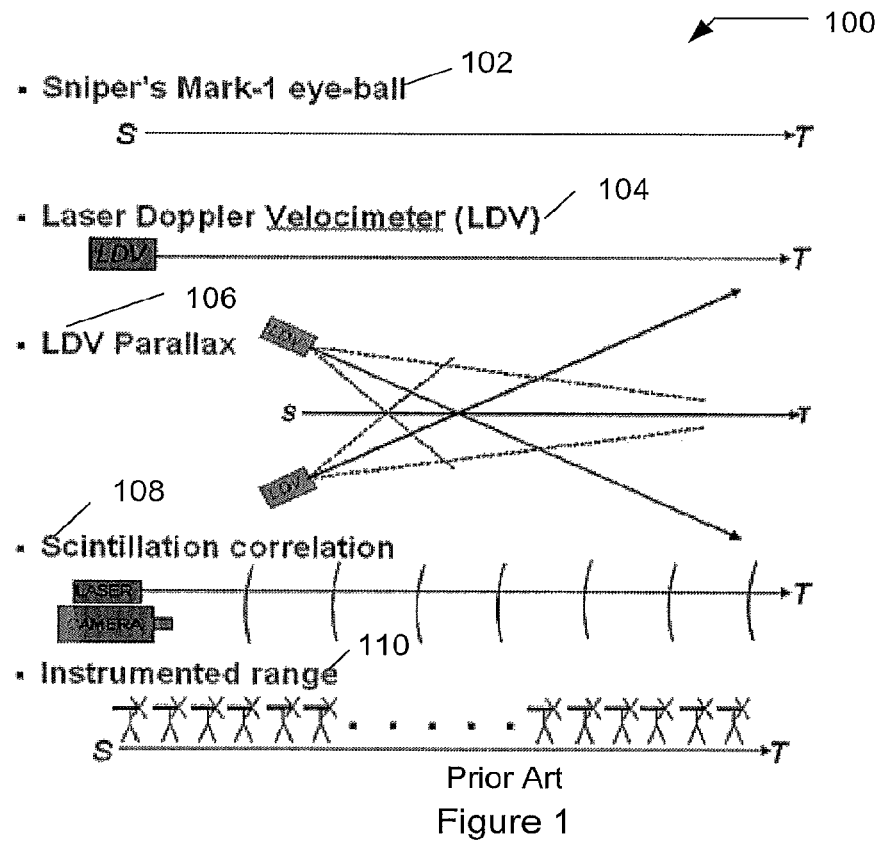
FIG. 1 is a diagram illustrating known approaches that attempt to gauge cross-range wind.
Figure 2:
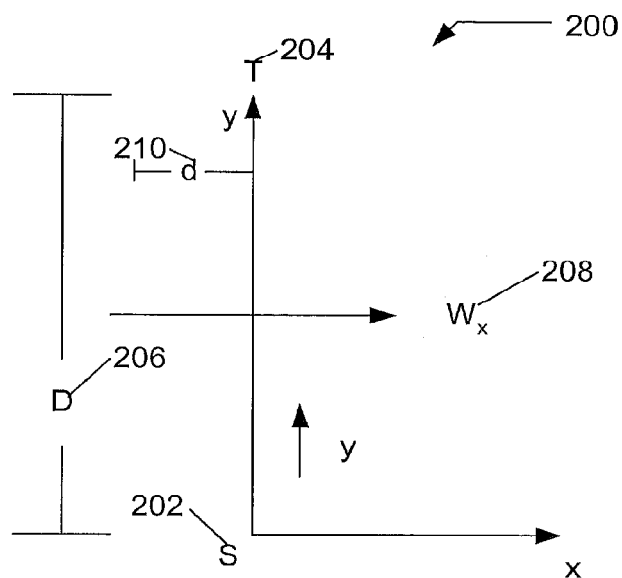
FIG. 2 is a diagram illustrating the positional relation between a direct fire weapon and an intended target in accordance with an example implementation of the invention.

In FIG. 2, a diagram 200 illustrating the positional relation between a direct fire weapon (for example, a rifle, cannon, or tank) and an intended target T is depicted. For purposes of illustration, the shooter S 202 (i.e. location of the direct fire weapon) is placed at the origin of a Cartesian coordinate system in which the y-axis is collinear with the direct line of sight between the shooter S and the target T 204, the x-axis is the horizontal direction orthogonal to the line of sight, and the z-axis (not shown) is the vertical direction relative to ground. The line-of-sight distance between the shooter S (y=0) and the target T may be given by D 206 (a value for the y-coordinate at the target T 204). A typical sniper rifle (not shown) to which the present teachings may be applied will be equipped with a telescopic sight (e.g., a scope) that includes a reticle, which aids the shooter S 202 of the weapon in finding, viewing and aiming at the target T 204. A scope of any suitable design may be utilized.

According to the present teachings described herein, the aimpoint of the sniper rifle is corrected to compensate for the effect of a spatially-varying horizontal crosswind (i.e., a crosswind having an x-component) on the impact point of the projectile (e.g., bullet). In the absence of such a correction, the crosswind in the x-direction ($W_x$ 208) would steer the bullet away from a straight downrange (y-direction) path. The correction may be implemented by finding a value for the horizontal offset, d 210, due to the crosswind existing at the target T 204, and then correlating this offset with an adjustment to be made (manually or automatically) to the rifle's scope, thereby enabling the shooter S 202 to accurately and consistently hit the target T 204.

For convenience, the following description will focus on correcting for the presence of a horizontal crosswind. It will be appreciated by persons skilled in the art, however, that the present teachings may be applied analogously to a crosswind described by a vertical component (i.e., in the z-direction). This description will not discuss correction in the z-direction caused by gravity acting on the mass of the projectile, as approaches for gravity corrections are known.

In the case of constant or homogeneous winds, the determination of the horizontal offset d 210 may be derived from the Didion Equation that was put forth in 1858 by French engineer/mathematician Isadore Didion:

$$d = Wx\left(t - \frac{D}{Vo}\right), \quad (1)$$

where:
D is the distance to the Target (downrange),
$V_o$ is the muzzle velocity,
t is the time of flight to the target,
Wx is the cross-range wind speed, and
d is the cross-range offset (drift) at the target.

In the present context, the Didion Equation may be considered as being applicable to finding the horizontal offset d 210 that would be due to a spatially constant crosswind, by considering $W_x$ 208 as representing the horizontal crosswind as a function of distance (y) downrange, t as the time of flight of the bullet from the rifle's muzzle (i.e., shooter S 202) to the target T 204, D 206 as the distance along the y-axis from the shooter S 202 to the target T 204, and $V_o$ as the muzzle velocity.

The time-to-impact (t) is not easy to establish in combat conditions so Didion also derived t as a function of bullet parameters:

$$t = \frac{1}{kVo}(e^{kD} - 1), \quad (2)$$

where $k = \rho C_d A / 2M$ with A=bullet cross sectional area, M=bullet mass, $\rho$=air density, and $C_d$=coefficient of drag. $C_d$ accounts for bullet shape and is, in general, a function of velocity. $C_d$ is tabulated for each bullet by manufacturers and is available on the internet. For historical reasons manufacturers list $C_d$ as a multiple (fraction) of a "standard" bullet's drag. (Care must be exercised in converting the manufacturer's values to the physical coefficient of drag since the properties of the "standard" bullet are not necessarily consistent across manufacturers.) For simplicity the value k=0.001/m will be used for the remainder of this example implementation as it is consistent with a 0.30 caliber SIERRA MATCHKING bullet, a favorite among long-range shooters.

What Didion was unable to determine was down-range crosswind as a function of down-range position. For use with remote measurement techniques that will be explained in more detail later, the Didion equation may be generalized for non-constant crosswinds:

$$d = \frac{k}{Vo}\int_0^D \int_0^y Wx(y')e^{ky'}dy'dy. \quad (3)$$

Thus, to calculate the offset for non-constant crosswinds one must know the value of the crosswind as a function of the downrange coordinate: Wx(y). Equation (3) may be integrated by parts to yield:

$$d = \frac{k}{Vo}\int_0^D (D-y)Wx(y)e^{ky}dy. \quad (4)$$

Derivation of the Generalized Didion Equation (3) is not shown, but it may be derived by following Didion's original derivation but without extracting Wx from the integrals, where Equation (4) governs the bullet offset due to non-homogeneous crosswinds.

Figure 3:
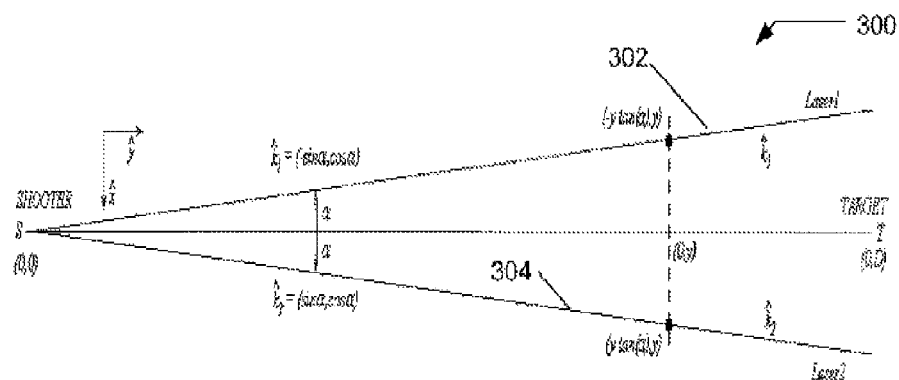
FIG. 3 is a conceptual diagram of a system with diverging laser beams that functions as a Doppler wind sensor in accordance with an example implementation of the invention.

The example of determining the crosswind and a function of downrange distance that overcomes the drawbacks of previous approaches is shown in FIG. 3. Considering the conceptual diagram 300 of FIG. 3, the diverging laser beams 302 and 304 may function as individual Doppler wind sensors and return a measurement of the projection of the wind field onto the laser direction at any point. We specify the unknown wind velocity field by:

$$\vec{W}(x,y) = Wx(x,y)\hat{x} + Wy(x,y)\hat{y}, \quad (5)$$

a vector function of x and y. The wind sensors return a speed measurement at downrange coordinate y given by:

$$m_1(y) = \vec{W}(-y\tan\alpha, y) \cdot \hat{k}_1 = -Wx(-y\tan\alpha, y)\sin\alpha + Wy(-y\tan\alpha, y)\cos\alpha$$

$$m_2(y) = \vec{W}(y\tan\alpha, y) \cdot \hat{k}_{21} = Wx(y\tan\alpha, y)\sin\alpha + Wy(y\tan\alpha, y)\cos\alpha. \quad (6)$$

Subtracting the two measurements, and a little algebra results in the following expression:

$$\frac{m_2(y) - m_1(y)}{2\sin\alpha} = \left\{\frac{Wx(y\tan\alpha, y) + Wx(-y\tan\alpha, y)}{2}\right\} + y\left\{\frac{Wy(y\tan\alpha, y) - Wy(-y\tan\alpha, y)}{2y\tan\alpha}\right\}. \quad (7)$$

We recognize the first term in the curly braces as the mean crosswind at a distance y. The second term in curly braces is likewise recognizable as the gradient of Wy in the x direction. Thus, we make the following substitutions:

$$\left\{\frac{Wx(y\tan\alpha, y) + Wx(-y\tan\alpha, y)}{2}\right\} = Wx(0, y) \quad (8)$$

$$\left\{\frac{Wy(y\tan\alpha, y) - Wy(-y\tan\alpha, y)}{2y\tan\alpha}\right\} = \frac{dWy}{dx}. $$

Then the expression can be simplified:

$$\frac{\Delta m(y)}{2\sin\alpha} = Wx(y) + y\frac{dWy(y)}{dx}. \quad (9)$$

It is recalled from fluid mechanics that the respective x- and y-components of a wind field W may be described as gradients of a scalar potential function φ (phi). Thus, $$Wx = \frac{d\varphi}{dx} \text{ and } Wy = \frac{d\varphi}{dy}. \quad (10)$$

The value dWx/dy may be further manipulated by the following set of identities:

$$\frac{dWx}{dy} = \frac{d}{dy}\left(\frac{d\varphi}{dx}\right) = \frac{d^2\varphi}{dydx} = \frac{d^2\varphi}{dxdy} = \frac{d}{dx}\left(\frac{d\varphi}{dy}\right) = \frac{dWy}{dx}. \quad (11)$$

Substituting into equation (11) into equation (9) and integrating over y gives:

$$\int_0^y \frac{\Delta m(y')}{2\sin\alpha} dy' = \int_0^y \left(Wx(y') + y'\frac{dWx(y')}{dy'}\right) dy' = yWx(y). \quad (12)$$

Solving for the crosswind:

$$Wx(y) = \frac{1}{2y\sin\alpha}\int_0^y \Delta m(y') dy'. \quad (13)$$

Equation (13) is the desired expression for the crosswind at a distance y from the shooter based on measurements that are easily made with existing devices. While it is reasonable to make the desired wind speed measurements using a pair of Doppler wind sensors a solution that reduces complexity and is substantially self-calibrating is described in this section.

Figure 4:
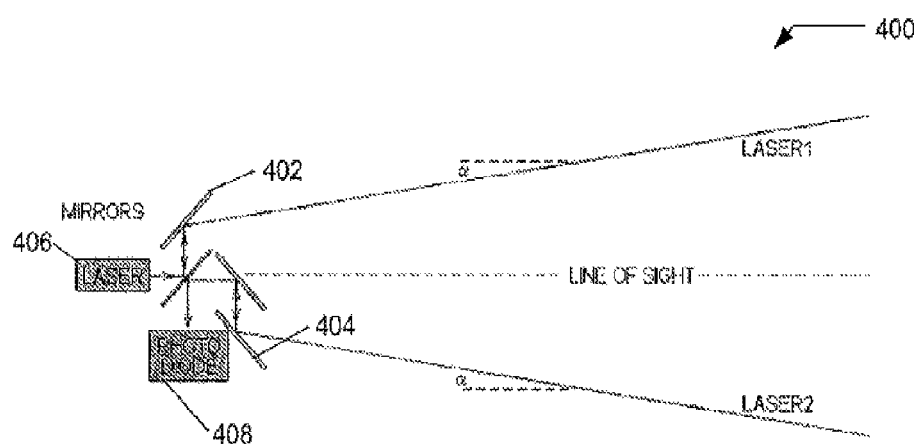
FIG. 4 is a diagram illustrating a crosswind gradient measuring device using the concepts depicted in FIG. 3 in accordance with an example implementation of the invention.

Turning to FIG. 4, a diagram illustrating a crosswind gradient measuring device that employs the concepts of FIG. 3 in accordance with an example implementation of the invention is depicted. In the preferred approach one may use a "Doppler differential interferometer" (DDI) sensor 400 that employs both free legs that are used as symmetric probe beams (unlike a traditional Michelson interferometer). The geometry of the self-aligning interferometer may be seen in FIG. 4. The angle α is set by the angle of the final mirrors 402 and 404 on each leg and will be selected based on the application but will always be small.

The distance downrange (y) is parameterized by the time (t) between the observation and the pulse leaving the laser:

$$y = \frac{1}{2}ct\cos\alpha, \quad (14)$$

where c, as usual, is the speed of light. The pulse from the laser 406 must be long enough to resolve the desired beat frequencies. For example a 0.5 micron laser wavelength and a 2 MHz frequency resolution results in a 0.5 m/s velocity sensitivity every 70 meters down-range with a 500 nsec laser pulse.

The photo-detector (photodiode 408) senses a beat frequency that indicates the difference in the individual Doppler-shifted frequencies of each beam. Fourier analysis will extract the beat frequency which, for typical terrestrial wind conditions will be less than a few MHz. The Doppler shifted frequency of each beam is given by:

$$f_{1,2} = \frac{2}{\lambda}\vec{W}(\mp y\tan\alpha, y) \cdot \hat{k}_{1,2} = \frac{2}{\lambda}m_{1,2}(y), \quad (15)$$

where we have used equation (6) to replace the vector dot product. The beat frequency is the difference between the Doppler frequencies:

$$\Delta f = f_2 - f_1 = \frac{2}{\lambda}(m_2(y) - m_1(y)) = \frac{2}{\lambda}\Delta m(y). \quad (16)$$

Equation (13) may be re-written in terms of the measurements made by the DDI thusly:

$$Wx(y) = \frac{\lambda}{4y \sin\alpha} \int_0^y \Delta f(y') dy'. \quad (17)$$

Computing the Bullet Drift:

The bullet drift may be expressed in terms of the measured beat frequencies by combining equations (17) and (4):

$$d = \frac{\lambda}{4V_0 \sin\alpha} \int_0^D k\left(\frac{D-y}{y}\right)\left\{\int_0^y \Delta f(y') dy'\right\} e^{ky} dy. \quad (18)$$

Equation (18) may be integrated by parts to cast the formula into a more favorable format:

$$d = \frac{\lambda}{4V_0 \sin\alpha} \int_0^D \Delta f(y) \left\{\int_{ky}^{kD} \frac{kD-z}{z} e^z dz\right\} dy. \quad (19)$$

Equation (19) is more favorable in that the integral inside the curly braces may be considered a weighting factor that depends only upon the distance downrange and static parameters of the rifle, bullet and atmosphere. We name this the "K-factor" and define it as:

$$K(kD, ky) = \int_{ky}^{kD} \frac{kD-z}{z} e^z dz. \quad (20)$$

Figure 5:
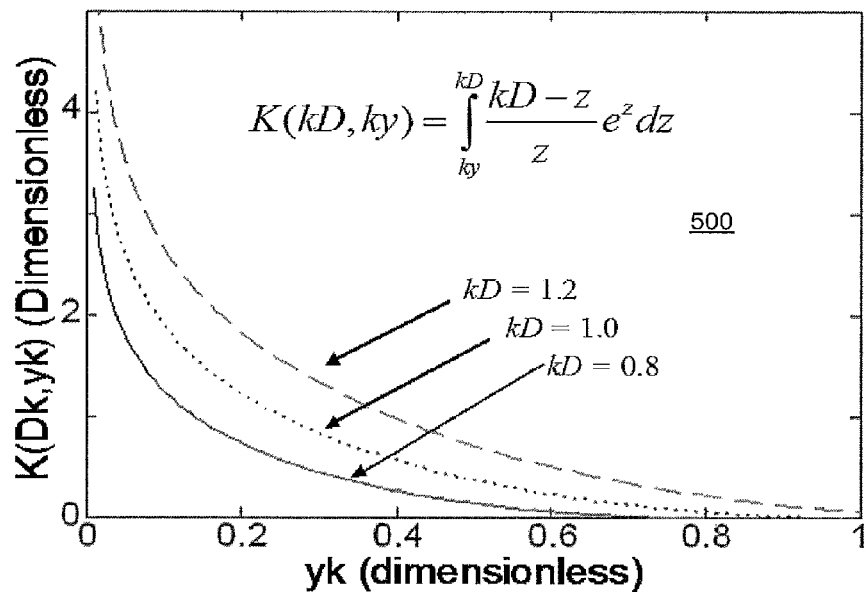
FIG. 5 is a graph of K-factors for a representative range of values in accordance with an example implementation of the invention.

Since the integrand has a pole at z=0 the K-factor is defined only over intervals that do not include zero. For all cases of interest for shooters, both ky and kD are positive. FIG. 5 shows a graph 500 of K-factors for a representative range of values. For a given rifle-bullet (i.e. weapon-shell) combination the K-factor may be pre-computed for easy application in the field.

The bullet offset is determined by:

$$d = \frac{\lambda}{4V_0 \sin\alpha} \int_0^D K(kD, ky) \Delta f(y) dy, \quad (21)$$

in which the values of $\Delta f(y)$ are measureable with the DDI instrument described and the values of K, $V_0$, $\lambda$ and $\alpha$ can be determined a priori.

Figure 6:
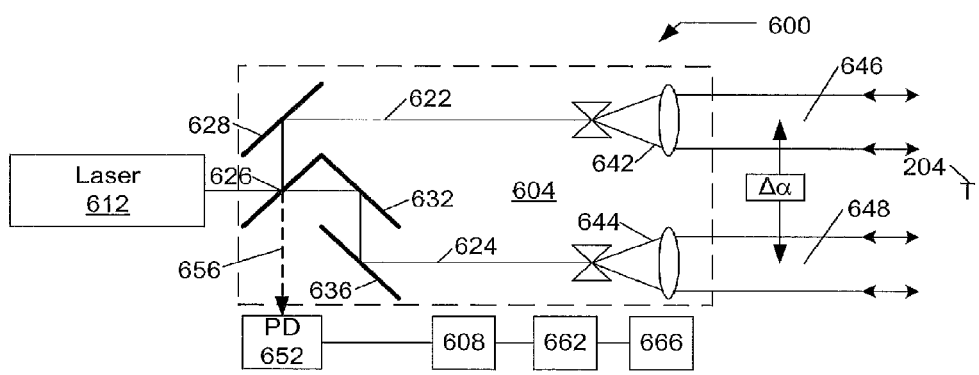
FIG. 6 is a block diagram of the crosswind gradient measuring device of FIG. 4, in accordance with an example implementation of the invention.

Turning to FIG. 6, a block diagram 600 of a crosswind gradient measuring apparatus (or device, system, etc.) of FIG. 4 in accordance with an example implementation is depicted. The crosswind gradient measuring apparatus 600 generally includes an optics device 604 and a signal processing device (or signal processor) 608. The optics device 604 and the signal processor 608 may be enclosed in any suitable housing (not shown), may be carried by the shooter S 202, FIG. 2 and/or mounted to or on the shooter's weapon or in a vehicle, and may be self-powered such as via an internal power source (e.g., battery). In the illustrated example, the optics device 604, FIG. 6 is configured as an interferometer in a novel manner that is herein termed a Doppler differential interferometer (DDI).

The optics device 604 may include any suitable source of coherent light such as a laser 612 of any suitable type, a beam splitter 626 of any suitable type (e.g., grating, half-mirror, etc.) for splitting the laser beam into two probe beams 622, 624, and one or more mirrors 628, 632, 636 as necessary for directing the two probe beams 622, 624 toward the downrange target T at a horizontal spacing $\Delta x$ on either side of the line-of-sight y-axis with a predetermined angle $\alpha$ (or vertical spacing $\Delta z$ with a predetermined angle $\alpha$ in the case of vertical correction). The optics device 604 may further include separate collection/transmission optics (lenses, etc.) 642, 644 for each probe leg for respectively transmitting collimated probe beams 646, 648 toward the target T and receiving backscattered light. The optics device 604 further includes a photodetector 652 of any suitable type (e.g., a photodiode) for receiving and measuring backscattered light. By measuring the intensity of the backscattered light as a function of time, the photodetector 652 shows a Doppler frequency beat resulting from the difference in the respective velocities of the winds encountered by the two probe beams 646, 648 propagating through the air.

In use, the shooter aims the crosswind gradient measuring apparatus 600 toward the target T and activates the laser 612. The laser beam is split into the two probe beams 622, 624, as directed by the mirrors 628, 632 and 636 downrange (y-direction) and at an angular separation of $\alpha$. A fraction of the laser light originating from each of the probe beams 622, 624 is scattered back toward the crosswind gradient measuring apparatus 600 by aerosols in the air and directed by the mirrors 628, 632 and 636 to the beam splitter 626, where the backscattered light rays are combined and transmitted along a path 656 to the photodetector 652. As noted above, the photodetector 652 senses a beat frequency that indicates the difference in speed between the two legs of the interferometer. Stated differently, the beat frequency at the photodetector 652 indicates the difference in downrange wind speed at conjugate points. It can be seen that this new technique is both motion and vibration tolerant.

It will also be noted that the laser 612 is pulsed to provide range by time of flight. The pulse must be long enough to resolve the desired beat frequencies. For example, a 0.5 micron laser wavelength and a 2 MHz frequency resolution results in a 0.5 m/s velocity sensitivity every 70 meters downrange with a 500 nsec laser pulse.

From the measurements made by the photodetector 652, equations (11), (4) and (3) above may be utilized to calculate the bullet's crosswind offset, d. In the present example, the photodetector 652 transmits electrical signals corresponding to the incident light detected to the signal processor 608 and the signal processor 608 performs the necessary calculations. As appreciated by persons skilled in the art, the signal processor 608 may be configured in a wide variety of different ways readily apparent and implementable without undue experimentation, and thus the signal processor 608 requires only a brief description herein. Generally, the signal processor 608 may be any microprocessor-based device that may include various hardware attributes (e.g., a central-processing unit, system memory, busses for communicating signals to or from various components, input and/or output interfaces, a display or readout, etc.). The calculations performed to obtain the crosswind offset d may be implemented by the signal processor 608 as an algorithm, which may be executed by hardware or firmware of the signal processor 608 such as a digital signal processor (DSP), application-specific integrated circuit (ASIC) or other type of processing unit. Additionally or alternatively, all or part of the calculations may be performed by software executed by the signal processor 608, i.e., a set of computer-executable instructions.

Once the crosswind offset d is calculated, the shooter's telescopic sight or scope may then be adjusted, by any means either manual or automated, to indicate the calculated hit point. The signal processor 608 may be configured to correlate the calculated value for the crosswind offset "d" to an adjustment level that will depend on the type and design of the telescopic sight being utilized. As an example, in the case of manual adjustment and for a scope that implements offset adjustments by the shooter incrementally rotating a part of the telescopic sight, the signal processor 608 may cause an output to be displayed (or otherwise communicated) to the shooter that indicates "four clicks counterclockwise". As an example in which adjustment is automated, the calculated crosswind offset d may be correlated to a control signal generated by the signal processor 608 that actuates an adjustment mechanism mechanically linked to the telescopic sight.

The automated approach is diagrammatically illustrated in FIG. 6, which shows the signal processor 608 in signal communication with an adjustment mechanism 662 and the adjustment mechanism 662 communicating with (e.g., mechanically linked to) a telescopic sight 666. The adjustment mechanism 662 and corresponding telescopic sight 666 may be implemented in any suitable manner. For example, the adjustment mechanism 662 may include one or more servo motors, solenoids or similar mechanisms that communicate with an appropriate adjustable portion of the telescopic sight 666 via suitable linkages. In other examples, whether manual or automated, the adjustment may be only partially mechanical or not mechanical at all. For instance, the adjustment may entail projecting information in the shooter's scope 666, such as a lighted dot that the shooter must align with the reticle to effect the offset adjustment.

As noted above, the crosswind gradient measuring apparatus 600 may be adapted for use in providing an offset adjustment that accounts for a vertically directed crosswind gradient. In one example, this is accomplished by rotating the crosswind gradient measuring apparatus 600 ninety degrees about the y-axis relative to the firearm, by any suitable manual or automated means. In this manner, the two diverging probe beams 622, 624 are positioned above and below the y-axis by the predetermined angle instead on either side of the y-axis. In still other implementations, two crosswind gradient measuring apparatuses may be provided, either as separate modules or integrated together, with one apparatus configured for measuring horizontal crosswind gradients and the other apparatus configured for measuring vertical crosswind gradients. The respective offsets $d_x$ and $d_z$ measured by the apparatuses may then be utilized by the signal processor 608 to generate an adjustment solution that accounts for crosswinds in both dimensions.

In another implementation, a crosswind gradient measuring apparatus may be provided in the form of two Doppler velocimeters mounted and oriented so as to direct respective probe beams in a manner similar to that shown in FIG. 4. In this case, each velocimeter would measure the downrange wind speed as a function of range and the two measurements may then be subtracted through performing an algorithm to give the same result as described above for the DDI described above. At the present time, however, it is believed that the DDI is less subject to detector noise and round-off errors.

Discrete measurements that may be applied are described in detail below. Such measurements may be performed by hardware and/or software as noted above. Briefly here, it is noted that the Doppler shift for backscatter is $\Delta f = 2V/\lambda$. As an example, for a wind change of V=1 m/s and a wavelength of $\lambda = 1$ μm, the beat frequency is 2 MHz. To resolve a 2-MHz beat frequency, the laser pulse must be at least 500 ns in duration. A 500-ns, 1-micron pulse results in a range resolution ($\Delta y$) of about 70 or 75 m. Hence, for example, a 1000-m sniper shot yields N=14 measurements of wind change, where N=D/$\Delta y$, D is the range to target (e.g., 1000 m) and $\Delta y$ is the range resolution (e.g., 70 m). The set of N measurements, $M_i$, is proportional to the relative Doppler shift between the two legs of the interferometer, $\Delta f$. The integrals in the generalized Didion Equation given above may be approximated by summing over the measurement set $M_i$ and noting that:

$$M_i = \frac{\Delta W x_i}{\Delta y} \approx \frac{dWx(y_i)}{dy}, \tag{22}$$

and further noting that the apparatus described above measures:

$$\frac{dWy}{dx} = \frac{dWx}{dy}, \tag{23}$$

which is true for incompressible flow.

A recursion relation for Wx(y) may be expressed as follows:

$$Wx(y + \Delta y) = Wx(y) + \frac{dWx}{dy}\Delta y = Wx(y_i) + M_i \Delta y. \tag{24}$$

Further evaluation yields the following expression for horizontal offset, or windage, d:

$$d = \frac{k\Delta y^2}{V_o} \sum_{j=1}^{N} (N + 1 - j) e^{jk\Delta y} \left( W_o + \Delta y \sum_{i=1}^{j} M_i \right). \tag{25}$$

Wind Compensator Sensitivity

The sensitivity of the measurements described herein may be determined through appropriate experimentation. Generally, from various experiments it has been found that the use of shorter wavelengths results in increased sensitivity.

The parallel coherent light beam case and divergent coherent light beam case share the same key physical insight in their derivation as taught herein. It is therefore apparent to those skilled in the art that crosswind may similarly be measured using parallel coherent light beams situated a small distance apart. In the parallel coherent light beam embodiment, the divergent angle of the beams $\Delta \alpha$ shown in FIG. 6 is changed to a predetermined separation $\Delta x$ of the parallel beams. To calculate the offset for non-constant crosswinds one must know the value of the crosswind as a function of the downrange coordinate: Wx(y).

The crosswind field Wx(y) may be expressed as:

$$Wx(y) = Wx(0) + \int_0^y \frac{dWx}{dy'} dy',  \quad (26)$$

where Wx(0) is the crosswind at the shooter S (y=0) (which may be measured by any number of handheld devices such as, for example, an anemometer) and dWx/dy is the gradient of the crosswind in the downrange direction. According to the present teachings, the crosswind gradient dWx/dy may be directly and remotely measured by a crosswind gradient measuring device. Thus, as taught herein it can be seen that the crosswind field Wx(y) may be determined from parameters (Wx(0) and dWx/dy) that are now both measurable.

To measure the crosswind gradient dWx/dy, it is recalled from fluid mechanics that the respective x- and y-components of a wind field W can be described as gradients of a scalar potential function φ (phi). Thus, $$Wx = \frac{d\varphi}{dx} \quad (27)$$

and $$Wy = \frac{d\varphi}{dy}.$$

The value dWx/dy may be further manipulated by the following set of identities:

$$\frac{dWx}{dy} = \frac{d^2\varphi}{dydx} = \frac{d^2\varphi}{dxdy} = \frac{dWy}{dx}. \quad (28)$$

The value dWy/dx may be measured in a number of ways, including with a crosswind gradient measuring apparatus. Such an apparatus may be configured similar to the crosswind gradient measuring apparatus 600 described above in conjunction with FIG. 6. In this case, the optics device 604 may be configured for directing the two probe beams 622, 624 toward the downrange target T 204 at a predetermined horizontal spacing Δx (instead of the Δα shown in FIG. 6) on either side of the line-of-sight y-axis (or vertical spacing Δz in the case of vertical correction).

Figure 7:
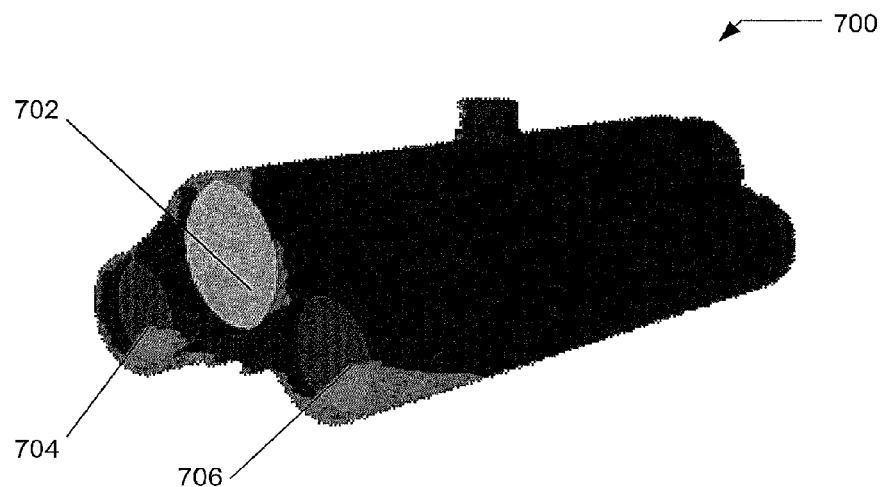
FIG. 7 is a front view drawing of the crosswind gradient measuring device of FIG. 4 in a rifle-mount configuration, in accordance with an example implementation of the invention.
Figure 8:
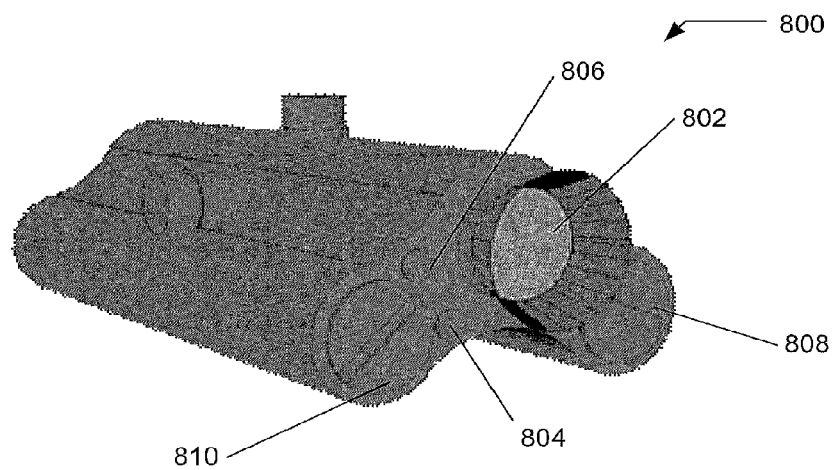
FIG. 8 is a rear view drawing of the crosswind gradient measuring device depicted in FIG. 7, in accordance with an example implementation of the invention.

In FIGS. 7 and 8 a front view 700 and rear view 800 drawing of an aimpoint corrector (crosswind gradient measuring device) of FIG. 4 in a rifle-mounted configuration is shown. The front view 700 (FIG. 7) shows a main scope aperture 702 and two laser apertures 704 and 706. The rear view 800 (FIG. 8) shows an eye cup 802, control buttons 804, 806 and battery compartments 808 and 810. The divergence between the two laser beams is too slight to be noticeable in the drawing.

Figure 9:
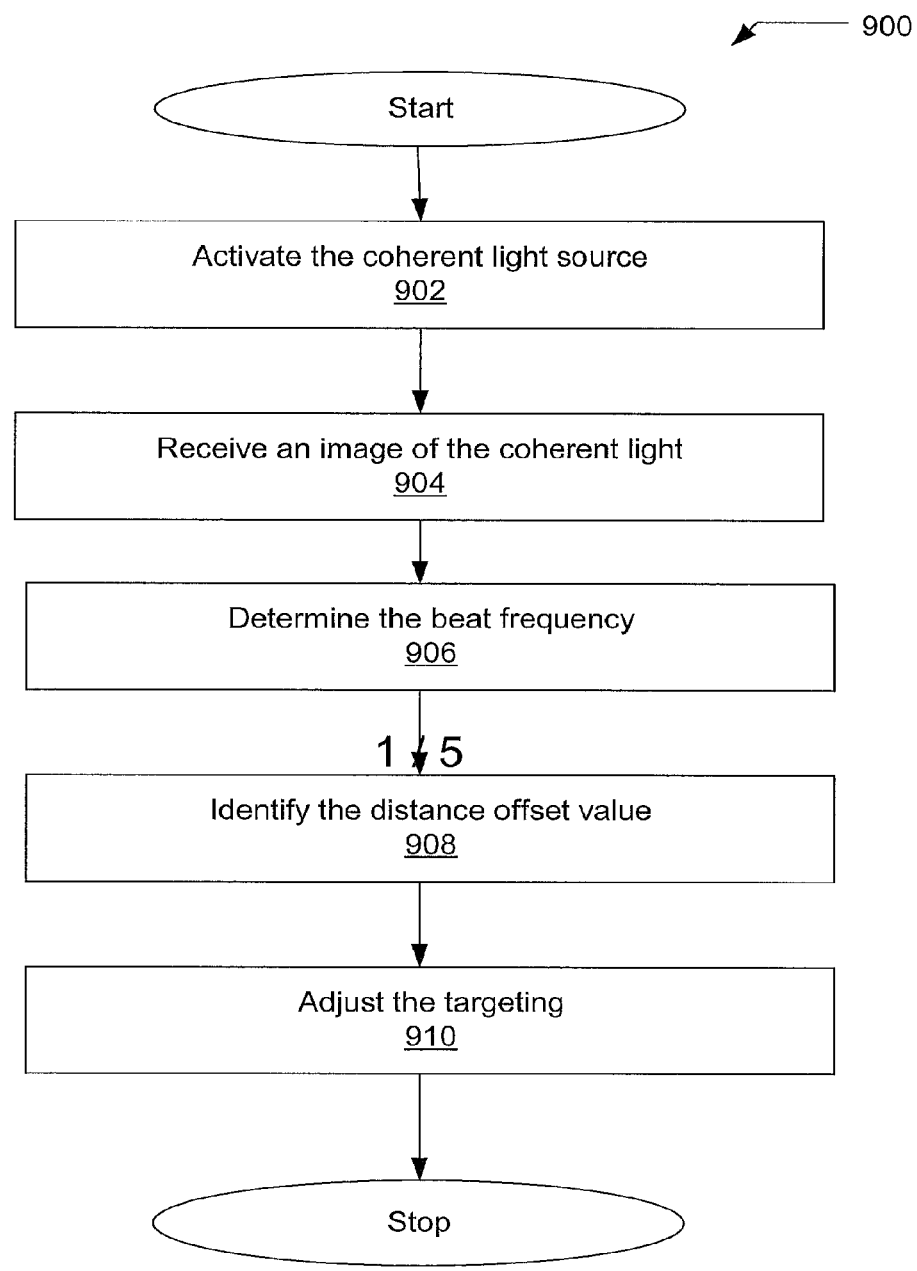
FIG. 9 is a flow diagram of the steps for aimpoint correction in accordance with an example implementation of the invention.

Turning to FIG. 9, a flow diagram 900 for the steps for aimpoint correction is depicted in accordance with an example implementation. A coherent light source, such as a laser, is activated and at least two probe beams of coherent light are projected at predetermined angles relative to a target 902. A photodetector detects and measures the intensity of backscattered light as a function of time 904. The Doppler frequency beat resulting from the difference in the respective velocities of the winds encountered by the at least two beams of coherent light 906 is identified. The crosswind offset "d" (e.g., the projectile impact point offset) using the identified Doppler frequency beat 908 is calculated. The targeting may then be adjusted by "d" 910.

It will be understood, and is appreciated by persons skilled in the art, that one or more processes, sub-processes, or process steps or modules described in connection with FIG. 9 may be performed by hardware and/or software. If the process is performed by software, the software may reside in software memory in a suitable electronic processing component or system in FIG. 6. The software in software memory may include an ordered listing of executable instructions for implementing logical functions (that is, "logic" that may be implemented either in digital form such as digital circuitry or source code), and may selectively be embodied in any tangible non-transitory computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The computer-readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper (such as punch cards) or another suitable medium upon which the program is printed and captured from and then compiled, interpreted or otherwise processed in a suitable manner if necessary, and then stored in a computer memory.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for measuring crosswind gradients downrange from at least one light source, the method comprising:
    directing a first coherent light beam and a second coherent light beam from the at least one light source in a downrange direction, and spaced from each other by a predetermined angle in the downrange direction;
    measuring scattered portions of the first light beam and the second light beam to determine a beat frequency indicative of a difference in crosswind velocity between the first light beam and the second light beam;
    determining a crosswind velocity in response to the beat frequency at a plurality of downrange distances; and determining an offset value based on the determined crosswind velocity at a plurality of downrange distances.

2. The method of claim 1, where determining the offset value further includes determining an amount by which a projectile traveling in the downrange direction to a downrange target is offset from a straight line between a point of origin of the projectile and a target located downrange from the point of origin.

3. The method of claim 2, comprising adjusting an aiming mechanism associated with firing the projectile to compensate for the offset value.

4. The method of claim 1, where directing the first coherent light beam and the second coherent light beam includes pulsing the first coherent light beam and the second coherent light beam for a period long enough to determine the beat frequency, where the period is determined based upon the light wavelength and frequency resolution.

5. The method of claim 1, where directing the first coherent light beam and the second coherent light beam includes generating the first coherent light beam with a first laser and the second coherent light beam with a second laser.

6. The method of claim 1, where measuring scattered portions further includes, measuring scattered portions with a photodiode.

7. The method of claim 1, where the first coherent light beam and second coherent light beam are parallel to each other.

8. An apparatus for measuring downrange crosswind gradients, comprising:
at least one coherent light source;
at least one mechanism that directs a first light beam and a second light beam from the at least one coherent light source along paths that are at a predefined angle;
a light detector that measures portions of the first light beam and the second light beam scattered back toward the apparatus;
a controller that determines a beat frequency indicative of a difference in crosswind velocity between the first coherent light beam and the second coherent light beam; and
an output device that is responsive to the controller determining an offset value associated with a crosswind velocity in response to the beat frequency at a plurality of downrange distances.

9. The apparatus of claim 8, where the controller is a signal processor that determines the beat frequency indicative of a difference in crosswind velocity between the first light beam and the second light beam.

10. The apparatus of claim 8, where the offset value is an amount by which a projectile traveling in the downrange direction to a downrange target is offset from a straight line between a point of origin of the projectile and a target located downrange from the point of origin.

11. The apparatus of claim 10, wherein the output device is a display that displays the offset value by which an aiming mechanism associated with firing the projectile should be adjusted to compensate for the offset value.

12. The apparatus of claim 10, the output device is an aiming mechanism that is automatically adjusted in response to the offset value.

13. The apparatus of claim 8, where the at least one coherent light source is a laser.

14. The apparatus of claim 8, where the light detector is a photodiode.

15. The apparatus of claim 8, where the at least one coherent light source is pulsed for a predetermined period long enough to determine the beat frequency, where the predetermined period is based upon the light wavelength and frequency resolution of the first light beam and the second light beam.

16. The apparatus of claim 8, where the first light beam and a second light beam are parallel to each other.

17. A non-transitory computer-readable medium with machine readable instructions that when executed result in a method for measuring crosswind gradients downrange from at least one light source, the non-transitory computer-readable medium comprising:
instructions for directing a first coherent light beam and a second coherent light beam from the at least one light source in a downrange direction, and spaced from each other by a predetermined angle in the downrange direction;
instructions for measuring scattered portions of the first light beam and the second light beam to determine a beat frequency indicative of a difference in crosswind velocity between the first light beam and the second light beam;
instructions for determining a crosswind velocity in response to the beat frequency at a plurality of downrange distances; and
instructions for determining an offset value based on the determined crosswind velocity at a plurality of downrange distances.

18. The computer-readable medium of claim 17, where determining the offset value includes determining an amount by which a projectile traveling in the downrange direction to a downrange target is offset from a straight line between a point of origin of the projectile and a target located downrange from the point of origin.

19. The computer-readable medium of claim 18, comprising instructions for adjusting an aiming mechanism associated with firing the projectile to compensate for the offset value.

20. The computer-readable medium of claim 17, where the instructions for directing the first coherent light beam and the second coherent light beam includes instructions for pulsing the first coherent light beam and the second coherent light beam for a period long enough to determine the beat frequency, where the period is determined based upon the light wavelength and frequency resolution.

21. The computer-readable medium of claim 17, where instructions for directing the first coherent light beam and the second coherent light beam includes instructions for generating the first coherent light beam with a first laser and the second coherent light beam with a second laser.

22. The computer-readable medium of claim 17, where instructions for measuring scattered portions further includes instructions for measuring scattered portions with a photodiode.

* * * * *